Patented May 3, 1949

2,469,014

UNITED STATES PATENT OFFICE 2,469,014

CHUCK

David Stålhandske, Bofors, Sweden

Application September 4, 1945, Serial No. 614,380
In Sweden February 8, 1944

5 Claims. (Cl. 279—55)

This invention relates to chucks substantially of the kind adapted to hold and drive cutting tools and it is an object of the invention to provide means for obtaining a great gripping power.

Another object of the invention consists in the provision of additional means for still more increasing such improved gripping power.

Still another object of the invention consists in the provision of improved means for quick exchange of tools.

The foregoing and still further objects will appear from the following detailed description of the invention as embodied in a preferred form of chuck, and from the accompanying drawings, in which.

Figure 1:
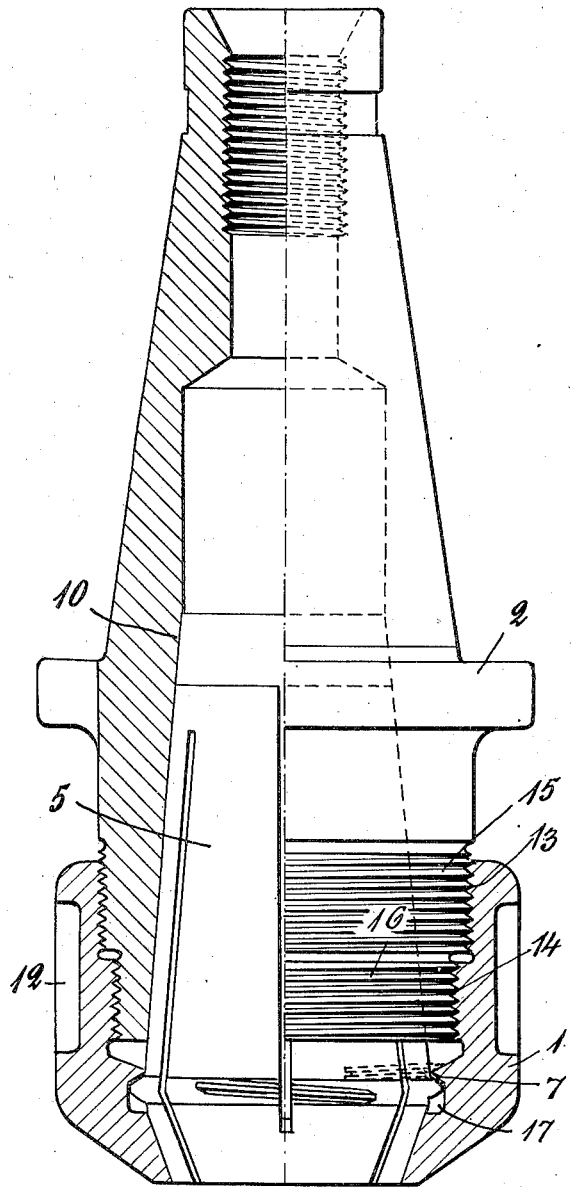
Fig. 1 is an elevational view, partly in section, of the chuck.
Figure 2:
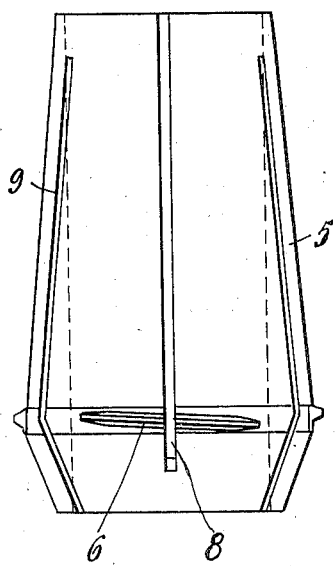
Figs. 2 and 3 are a side view and an end view respectively, of a collet forming part of the chuck.
Figure 4:
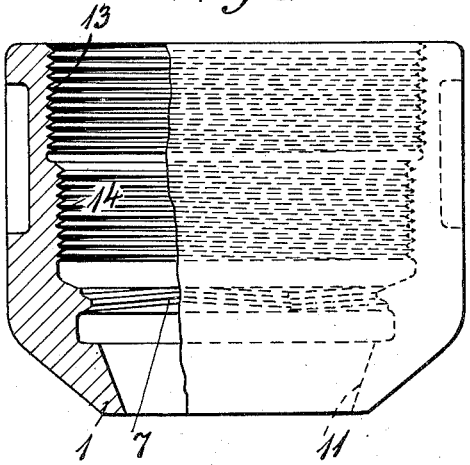
Fig. 4 is a sectional view of a locking nut of the chuck, taken on line IV—IV in Fig. 5.
Figure 3:
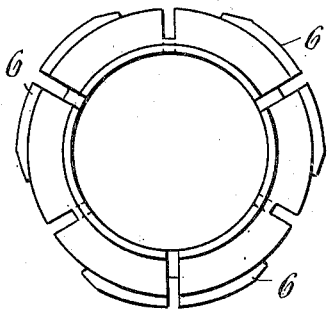
Figure 5:
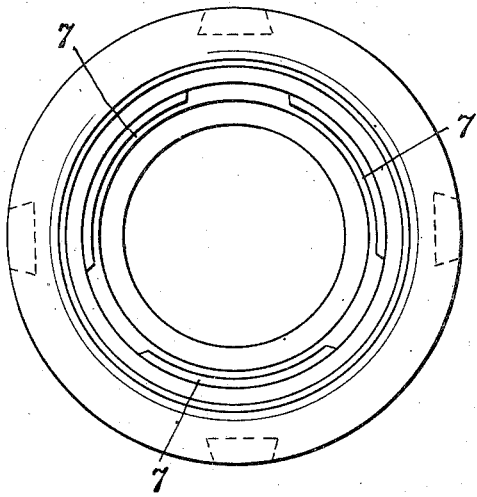
Fig. 5 is an end view of the locking nut shown in Fig. 4.

Referring to the drawings, a collet 5 adapted to receive cylindrical tool shanks is inserted into the chuck body 2. The collet 5 has three slots 8 extending from its tapered top end and three slots 9 extending from its oppositely tapered bottom end so that it is contractible and expansible at both its ends. The relatively slightly tapered upper portion of the collet is fitted into a taper-bore in the chuck body and the tapered bottom end is fitted into the tapered bottom end 11 of a locking nut 1. The collet 5 has three exterior cams 6 which form part of a multiplex thread, and the locking nut 1 is interiorly provided with a corresponding number of cams 7 which form part of a multiplex thread corresponding to and adapted to coact with that of the collet. The circumferential distances between the cams 6 of the collet and the circumferential distances between the cams 7 of the locking nut are such that the cams 6 and 7 can pass each other when assembling collet and nut on relatively turning them. The locking nut 1 has exterior recesses 12 for a hook-spanner fitting around said nut. Furthermore the nut 1 has two threaded portions 13 and 14 the threads of which have the same pitches but different diameters and correspond to two threaded portions 15 and 16, respectively, on the chuck body 2. The threads of the portions 13, 14, 15 and 16 extend in a direction opposite to that of the multiplex threads constituting the cams 6 and 7.

In order to obtain a great gripping power, the tapers of the collet and the chuck body are so slight that they are self-locking. This gripping power can be still more increased if the pitch of the threads 13, 14 and 15, 16 is relatively small. This will be possible without inconvenience since said threads are subdivided into two sections enabling a corresponding reduction of time necessary for screwing the nut to the chuck body.

When unscrewing the locking nut 1 its cams 7 are pressed against the cams 6 of the collet 5 on wedge action so that the collet is easily loosened from the chuck body even though it was forcibly secured by wedge to said body.

To facilitate the exchange of collets the cams 6 of the collet 5 and the cams 7 of the nut 1 are arranged in such way that upon relatively turning nut and collet the cams of the collet enter the openings between the cams of the nut and pass said openings on entering a recess 17 in the nut below its cams 7. When positioned in this recess the cams do not impede the tightening of the locking nut. Only when unscrewing the locking nut the cams are pressed against each other.

From the foregoing it will be apparent that the advantage of this chuck in comparison with earlier constructions consists mainly in the slight taper of the gripping collets, which create great gripping power and this is made possible by the provision of certain efficient means for releasing the collet from the chuck body, which means also enables a quick exchange of collets without the use of special tools.

On account of the slightly tapered collet, this chuck is more advantageously used for heavy-duty milling etc. than previously known chucks of the same size. Furthermore, the time for screwing on the locking nut to the chuck body and unscrewing said nut has been greatly reduced by the provision between locking nut and chuck body of a two-step thread. This arrangement has made it possible to reduce the pitch of said thread thus still more increasing the gripping power of the chuck.

I claim:

1. A chuck comprising a body having a taper bore, a collet adapted to carry a tool inserted therein and having a tapered portion adapted to fit tightly in said taper bore of said body, and a locking nut having screw threads for screwing said nut to said body to secure said collet to said body, said collet having exteriorly a plurality of cams forming segments of a multiplex thread, said nut having interiorly a plurality of corresponding cams forming segments of a multiplex thread and being adapted to coact with said cams of said collet, said multiplex threads and said screw threads extending in opposite directions, said cams of said nut and said cams of said collet being adapted to engage each other and coact to loosen said collet from said body when unscrewing said nut.

2. A chuck comprising a body having a taper bore, a collet adapted to carry a tool inserted therein and having a tapered portion adapted to fit tightly in said taper bore of said body, and a locking nut having screw threads for screwing said nut to said body to secure said collet to said body, said collet having exteriorly a plurality of cams forming segments of a multiplex thread, said nut having interiorly a plurality of corresponding cams forming segments of a multiplex thread and being adapted to coact with said cams of said collet, said multiplex threads and said screw threads extending in opposite directions, said cams of said nut and said cams of said collet being adapted to engage each other and coact to loosen said collet from said body when unscrewing said nut, said nut having an internal annular recess adapted to receive all the cams of said collet when the chuck is coupled.

3. A chuck comprising a body having a taper bore, a nut having an internally tapered end, a collet adapted to carry a tool inserted therein and having a tapered portion adapted to fit tightly in said tapered bore of said body and another oppositely directed tapered portion adapted to fit tightly in said internally tapered end of said nut, said locking nut having screw threads for screwing said nut to said body to secure said collet to said body, said collet having exteriorly between both its tapered portions a plurality of cams forming segments of a multiplex thread, said nut having interiorly a plurality of corresponding cams forming segments of a multiplex thread and being adapted to coact with said cams of said collet, said multiplex threads and said screw threads extending in opposite directions, said cams of said nut and said cams of said collet being adapted to engage each other and coact to loosen said collet from said body when unscrewing said nut.

4. A chuck comprising a body having a taper bore, a collet adapted to carry a tool inserted therein and having a tapered portion adapted to fit tightly in said taper bore of said body and having longitudinal slots extending alternately from opposite ends of the collet, and a locking nut having screw threads for screwing said nut to said body to secure said collet to said body, said collet having exteriorly a plurality of cams forming segments of a multiplex thread, said nut having interiorly a plurality of corresponding cams forming segments of a multiplex thread and being adapted to coact with said cams of said collet, said multiplex threads and said screw threads extending in opposite directions, said cams of said nut and said cams of said collet being adapted to engage each other and coact to loosen said collet from said body when unscrewing said nut.

5. A chuck comprising a body having a taper bore, a collet having a mouth and being adapted to carry a tool inserted into said mouth and having a tapered portion adapted to fit tightly in said taper bore of said body, a nut having screw threads for screwing said nut to said body to secure said collet to said body, said collet having exteriorly a plurality of circumferentially spaced cams in the proximity of said mouth forming segments of a multiplex thread, said nut having interiorly a plurality of corresponding circumferentially spaced cams forming a multiplex thread and being adapted to coact with said cams of said collet, said collet having longitudinal slots extending from its mouth between its cams and also having longitudinal slots extending from its opposite end and intersecting its cams, said multiplex threads and said screw threads extending in opposite directions, said cams of said nut and said cams of said collet being adapted to engage each other and coact to loosen said collet from said body when unscrewing said nut.

DAVID STÅLHANDSKE.

REFERENCES CITED

The following references are of record in the file of this patent:

UNITED STATES PATENTS

| Number | Name | Date |
|---|---|---|
| 165,546 | Cook | July 13, 1875 |
| 1,372,238 | Kreiter | Mar. 22, 1921 |
| 1,793,113 | Metcalf | Feb. 17, 1931 |
| 1,849,068 | Bridges | Mar. 15, 1932 |
| 2,038,602 | Redinger | Apr. 28, 1936 |

FOREIGN PATENTS

| Number | Country | Date |
|---|---|---|
| 361,919 | Germany | Oct. 26, 1920 |